US012733588B2

(12) United States Patent
Tenias Sancho

(10) Patent No.: US 12,733,588 B2
(45) Date of Patent: Sep. 15, 2026

(54) FRUIT-HARVESTING MACHINE

(71) Applicant: TENIAS HARVESTER S.L., Ejea de los Caballeros (ES)

(72) Inventor: Jesus Tenias Sancho, Ejea de los Caballeros (ES)

(73) Assignee: Tenias Harvester S.L., Ejea de los Caballeros (ES)

( * ) Notice: Subject to any disclaimer, the term of this patent is extended or adjusted under 35 U.S.C. 154(b) by 350 days.

(21) Appl. No.: 18/570,175

(22) PCT Filed: Jul. 23, 2021

(86) PCT No.: PCT/ES2021/070558
§ 371 (c)(1),
(2) Date: Dec. 14, 2023

(87) PCT Pub. No.: WO2023/275415
PCT Pub. Date: Jan. 5, 2023

(65) Prior Publication Data

US 2024/0284828 A1 Aug. 29, 2024

(30) Foreign Application Priority Data

Jul. 1, 2021 (ES) .................................. 202130616

(51) Int. Cl.
*A01D 46/26* (2006.01)

(52) U.S. Cl.
CPC .................................. *A01D 46/26* (2013.01)

(58) Field of Classification Search
CPC ...... A01D 46/264; A01D 46/22; A01D 90/04; A01D 90/10; A01D 2046/262; A01D 46/26
See application file for complete search history.

(56) References Cited

U.S. PATENT DOCUMENTS

| | | | | |
|---|---|---|---|---|
| 3,401,508 | A * | 9/1968 | Keller | A01D 46/082 56/12.2 |
| 9,832,929 | B1 * | 12/2017 | Majors | A01D 46/264 |
| 2002/0029551 | A1 * | 3/2002 | Tenias Sancho | A01D 46/26 56/340.1 |
| 2003/0063968 | A1 * | 4/2003 | Zaun | B60P 1/36 414/546 |
| 2017/0238466 | A1 * | 8/2017 | Tenias Sancho | A01D 46/264 |
| 2019/0200524 | A1 * | 7/2019 | Canela Sacanell | A01D 46/26 |
| 2019/0208705 | A1 * | 7/2019 | Pippi | A01D 46/264 |
| 2019/0327896 | A1 * | 10/2019 | Hill | A01D 46/26 |

FOREIGN PATENT DOCUMENTS

| | | | | |
|---|---|---|---|---|
| WO | WO-2020159370 | A1 * | 8/2020 | A01D 46/26 |

* cited by examiner

*Primary Examiner* — Brad Harcourt
(74) *Attorney, Agent, or Firm* — The Morales Law Firm; Joseph L. Morales, Esq.

(57) ABSTRACT

A fruit harvesting machine that works continuously, meaning without stopping to unload the fruit, as the fruit can be unloaded automatically upon detection of a transfer vehicle, by means of hoppers (34) with ejection conveyor belts (35) which are activated only when the transfer vehicle is detected, including an extendable and sliding skid (38), which prevents a large part of the vibrating energy from being absorbed by the suspension and wheels of the vehicle, with a four-wheel drive, a movable cabin and total control of the machine from inside the cabin.

20 Claims, 4 Drawing Sheets

FRUIT-HARVESTING MACHINE

FIELD OF THE INVENTION

The present invention refers to a fruit harvesting machine, and more specifically a tree fruit harvesting machine, of the type consisting of a self-propelled machine including a trunk vibrating device, with a foldable structure for easier transport and entry into the warehouse.

BACKGROUND OF THE INVENTION

Tree fruit harvesting machines are already known in the state of the art. Generally, they consist of a rigid structure consisting of two side frames which, on the lower side, leave an open longitudinal space for the passage of the tree trunk while the machine is moving during the harvesting process, and whose open longitudinal space includes vibrating elements, with timed action, which come into operation when the probes located on the side frames detect the presence of a fruit tree trunk. The vibrating action causes the fruits to detach and fall on mobile means that feed them to peeling means that perform the peeling of the fruit and then feed them to storage hoppers that can be foldable for the unloading of the peeled fruits.

An example of a harvesting machine of the type described above is the machine described in the Utility Model U-200002889, in which the harvesting machine comprises two side frames joined together by means of vertical, parallel gantries, extended at the top in the transverse direction of the machine, with two channels in the lower position, inside each of which extends a drive spindle with a vibrator mounted on guides that can move along a predetermined path, so that when a probe (sensor) detects the presence of a tree trunk in the open longitudinal space between the two channels, the vibrator acts in a timed manner on the tree trunk, causing the fruits to fall on inclined trays to direct them towards the inside of the channels in which they are transported by the spindles towards peeling devices for subsequent storage in the hoppers.

The machine includes a cabin from which an operator controls the various operations of the machine.

In parallel, the applicant is also the owner of invention Patent P201630205, which describes a self-propelled tree fruit harvesting machine, applicable to the harvesting of tree fruit by means of the action of a vibrator on the trunk of a tree when the presence of the tree trunk is detected by means of a probe, for which the machine comprises two side frames between which there is a lower longitudinal opening for the passage of the tree as the machine moves, these two side frames being linked at the top by means of two parallel gantries, transversely extended and separated by a certain distance in longitudinal direction, the machine having means of dragging located inside respective longitudinal channels, to move the detached fruits towards peeling devices located at the rear of each of the lateral frames of the machine from where they are dragged, once peeled, towards two hoppers of considerable capacity also located at the rear of each of the two frames of the machine, where each of said transverse parallel gantries is composed of a set of four segments successively articulated between each other at pivot points of which two end segments constitute fixed vertical uprights emerging from each respective side frame, and the two intermediate segments are articulated with the vertical uprights at pivot points between each other in an intermediate articulated position.

Although this machine improves on the performance of the machine described in utility model U-200002889, the machine still has several limitations including the following:

The machine cannot work continuously, having to make stops for unloading, interrupting the harvesting process and delaying operating times, which translates into additional harvesting operation costs.

As the vibrator works while the machine is moving, a large part of the vibrating energy is lost because it is not transmitted to the ground, being absorbed by the machine's suspension and its own wheels.

Lack of visibility in the cabin: The optimal position of the cabin is not the same depending on whether the machine is harvesting or moving to its storage place.

Lack of control of certain machine variables from the cabin: The machine does not allow control of all vibration and machine movement variables from the cabin.

Problems of lack of smoothness in the displacement due to the machine having only rear wheel drive.

SUMMARY OF THE INVENTION

The object of the invention is to provide a machine that allows to work in continuous operation, avoiding stops and downtime that significantly reduce the harvesting operating times.

It is therefore the object of the invention to provide a machine which allows unloading without the need to stop the machine so that the harvesting process is not stopped at any time.

It is also the object of the invention to provide a machine that includes means that allow to optimize the transmission of vibrations to the trunk while the machine is in motion, reducing the cushioning effect caused by the wheels and the cushioning system associated with the means of displacement (movement) of the machine itself.

In parallel, it is the object of the invention that the cabin of the machine is movable so as to provide optimal different extreme positions for the harvesting and transport maneuvers respectively. The cabin includes means for controlling the entire machine from the inside, both with respect to the vibration variables as to the movement of the machine.

Finally, it is the object of the invention to offer a machine whose traction system is optimal from the point of view of transmission of engine power to the ground, with smoother movements, less maintenance and greater adjustment of the speed, torque and power of the wheels.

The recommended fruit harvesting machine solved in a fully satisfactorily manner the above-mentioned problems in each and every one of the aspects detailed.

For this purpose, and starting from the structure described above, that is to say, from the machine covered by the invention Patent P201630205, the machine of the invention presents a series of improvements that considerably increase its performance.

Regarding the unloading system, it has been foreseen that the conveyor belts of the harvested fruit involved in each of the two frames of the machine unload onto high-capacity side hoppers, which in turn include an internal system of conveyor belts that eject the harvested fruit upon detection of a transfer vehicle.

In this sense, the transfer vehicle can be of various types; tractors, 4×4 forklifts and telescopic forklifts. These vehicles will have a bucket over which the stored fruit is poured directly into the side hoppers of the machine, so that the contents can be dumped into the corresponding trailer.

Thus a continuous and moving unloading system is offered, synchronizing the movement of the transfer vehicle with the harvesting machine, including said hoppers two types of detectors of presence of the unloading equipment, a mechanical actuator materialized in a “U” rod, which is actuated by contact with the bucket transported by the transfer vehicle, being able to also materialize in a rod of mechanical actuation, whose height will depend on the type of transfer vehicle used, and more specifically of the bucket associated with the same.

However, said detector could be an optical, magnetic, or any other type of sensor without mechanical contact.

This makes it possible to move from a discrete operating machine to a continuous operating machine.

In accordance with another feature of the invention, it is foreseen that the machine incorporates a system by means of which the energy supplied by the vibrator to the tree trunk is optimized.

As mentioned in the previous section, part of this energy was reduced/absorbed by the machine’s own suspension system and its wheels, so that it has been foreseen that in correspondence with the vibrator, the machine incorporates a sliding skid that supports and slides over the ground, which allows the machine to continue moving, but prevents to a large extent that the vibrations generated by the vibrator are absorbed by the suspension system and the wheels, as they are transmitted directly to the ground.

More specifically, this skid remains elevated during movement and a few seconds before it starts to vibrate, it lowers to the ground by exerting a hydraulic force against it through a hydraulic cylinder, which gives greater structural rigidity to the assembly and prevents the tree roots from moving, so that only the trunk flexes.

Another of the foreseen improvements refers to the machine’s control cabin.

The cabin will be movable between two limit positions, in order to offer a better view during transport as well as during the harvesting process.

Notwithstanding, the cabin can adopt an infinite number of intermediate positions between these two limit positions, depending on the size and position of the tree.

The cabin is driven by an electric cylinder that can be controlled from inside the cabin itself, with a simple and intuitive control by means of a lever.

As the harvester is programmed before harvesting begins, the operator has free hands to modify the position of the cabin at its convenience, without any inconvenience.

At the same time, all the machine’s vibration and movement variables can be controlled from the cabin.

For this purpose, the cabin will include a control panel for regulating the closing pressure of the vibrator fingers, the vibrating time, as well as the vibrating frequency.

In addition, hopper load sensors and peeler clogging detectors have been incorporated.

In this way the machine is controlled entirely from the cabin, although the controls are programmed before work is started so that the necessary adjustment during harvesting is minimal.

The control panel offers different forward speeds, so that in the harvesting position, a potentiometer registers the forward speed with absolute precision.

When registering the forward speed with the potentiometer, the driver only needs to press the accelerator pedal to its maximum and will not be able to exceed the speed registered on the potentiometer.

Thus, once all the parameters have been recorded before setting off, the driver simply holds the steering wheel and presses the accelerator pedal.

The programming will not allow driver to change the parameters unless they are modified voluntarily.

In this way, an automation system is achieved with minimal intervention by the worker.

Finally, another improvement of the invention is the incorporation of front wheel drive. By adding additional front wheel drive, the power of the engine is much better transmitted to the ground, resulting in an increase in speed of up to 33%.

In this way the machine moves faster and transports the material more cost-effectively.

In turn, the movement of the machine will be smoother, as it will be better distributed.

As for the electronics, it is also noticeable in its control, with simpler maintenance sensors, as it has fewer moving parts.

The machine offers easy adjustment of the speed, torque and power of the wheels, with a very fast start, stop and movement, eliminating work pauses.

It also offers better retention on slopes, facilitating the descent, a greater engine brake, avoiding wear on the brakes.

Also, it does not move slightly at zero speed.

On the other hand, the vibrating machinery is independent of the movement/transport machinery, which allows loading/unloading work on ramps or steep slopes.

BRIEF DESCRIPTION OF THE DRAWINGS

In order to complement the description that will be made herein below and with the purpose of helping to a better understanding of the characteristics of the invention, in accordance with a preferential example of practical realization of the same, a set of drawings is enclosed as an integral part of said description, in which the following has been represented for illustrative and non-limiting purposes.

DESCRIPTION OF THE INVENTION

Figures 1, 2:
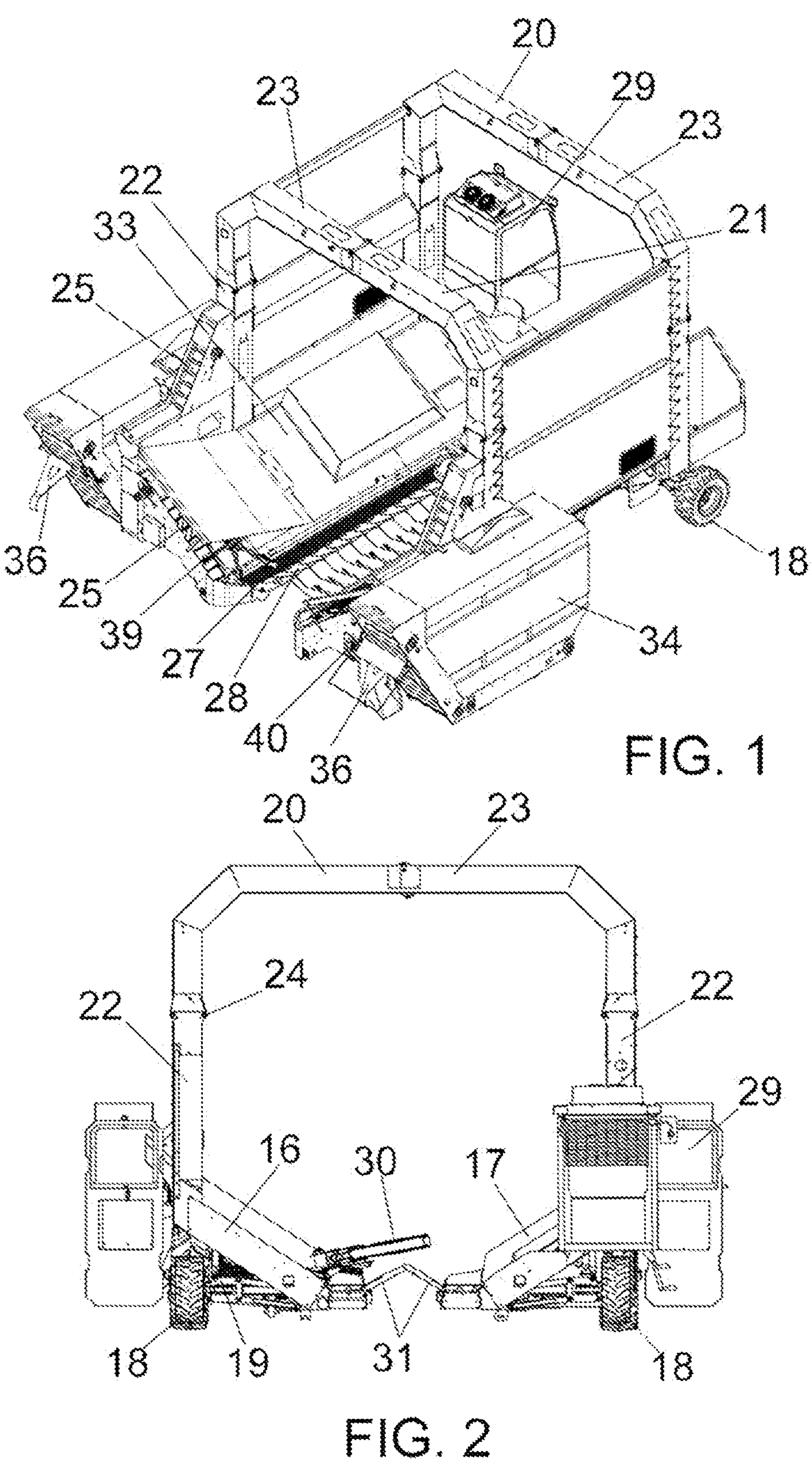
FIG. 1.—Shows a perspective view of a fruit harvesting machine made in accordance with the object of the present invention.
FIG. 2.—Shows a front elevation view of the machine in operational situation.

In view of the figures displayed, it can be seen how the harvesting machine of the invention is made up of two side frames (16, 17) separated from each other by an intermediate longitudinal opening of sufficient width to allow the passage of a trunk, of usual diameter, between both frames when the machine is moved during the harvesting operations of the fruits of a tree (not shown). Each of the side frames (16, 17) incorporates wheels (18) for its displacement (movement), each of the wheels having independent suspension means (19) on each wheel, which facilitates the adaptation of the machine to the irregularities of the ground and also the regulation of the height during transport.

The linkage between both side frames (16, 17) is made by means of gantries (20, 21), parallel to each other, extended according to the transverse direction of the machine and separated in longitudinal direction by a previously established distance. These gantries are conceived in the same manner, that each of them is comprised of four segments successively articulated among themselves. Reference is made to the gantry (20) for the purpose of description, two of the segments consist of vertical uprights (22), each of them fixed and emerging from each respective side frame (16, 17), and the other two segments referenced as (23), extend according to the upper horizontal direction in general, articulated respectively with the vertical uprights (22) at tilting points (24), and with each other by means of a tilting means in a central position. The same arrangement can be seen in relation to the gantry (21), for which the description is omitted in order to avoid unnecessary repetition.

On the other hand, each of the side frames (16, 17) of the machine of the invention includes, in a conventional manner, a longitudinally extended channel, in positions mutually facing those of both frames, inside of which a means of displacement of the harvested fruits is housed. These means of displacement of the harvested fruits consist of conveyor belts (27) specifically designed and finished to avoid damaging the detached fruits, which drag said fruits towards the rear part of the machine where some large capacity hoppers are located (34), which store the harvested fruits. The belts are laterally complemented with elastic sheets (28) that adapt to the contour of the tree trunk, and that act as deflectors of the fallen fruits towards the mentioned conveyor belts.

Additionally, the machine incorporates, as is usual, a cabin (29) from which an operator controls at all times the performance of the machine during the harvesting or moving operations, although, in the case of the present invention, this cabin (29) is not fixedly positioned but can be moved laterally on guides towards the outside and towards the inside by means of cylinders (not visible in the Figure). With this, the cabin (29) can adopt an interior position, corresponding to the transport position, meaning occupying the minimum possible width, and an exterior position, meaning displaced outwards from the machine, corresponding to the operating condition of said machine and therefore away from the passage space of the trees between both side frames (16, 17) in a way that it does not affect the tree branches.

In the representation of the figures of the cabin, (29) it appears located on the side frame (17), although this should not be understood as limiting since it could be located on the opposite side frame, as appropriate.

It is also conventional, the vibrator (30) is located on one of the sides of one of the side frames, in the present case on the side frame (16), being able to be coupled to the tree once the presence of the trunk is detected by means of probes (31), the action of the vibrator (30) being timed framed.

Said vibrator is movable along longitudinal guides, through a predetermined path, in the opposite direction to the movement of the machine, so that this movement/displacement occurs in synchrony with the machine with the vibrator (30) static in relation to the tree to which it is applied, during the period of time established by the timer device associated with said vibrator.

This action allows the machine to maintain a continuous operation, so that once the timing period has expired, the vibrator (30) is released from the tree to which it was applied and returns to its initial position, to start the cycle again when the machine reaches the position of a new tree detected by the probes (31).

Figure 5:
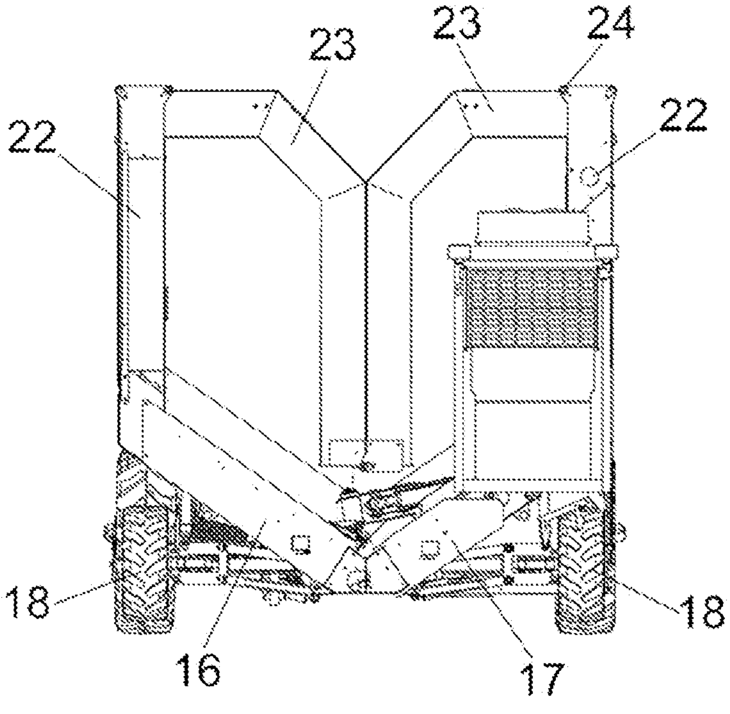
FIG. 5.—Shows a front elevation view of the folded machine, in transport/storage situation, without the continuous unloading hoppers.
Figure 6:
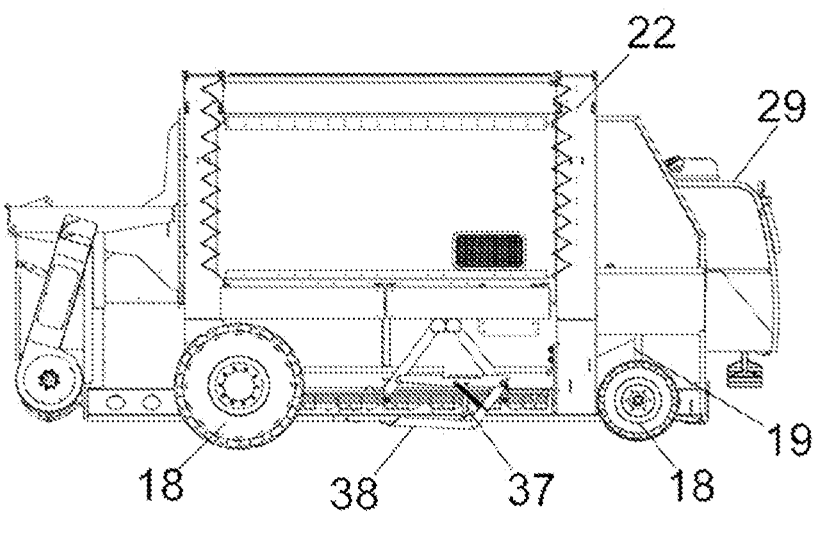
FIG. 6.—Shows a profile view of the assembly of FIG. 5.
Figures 7, 8:
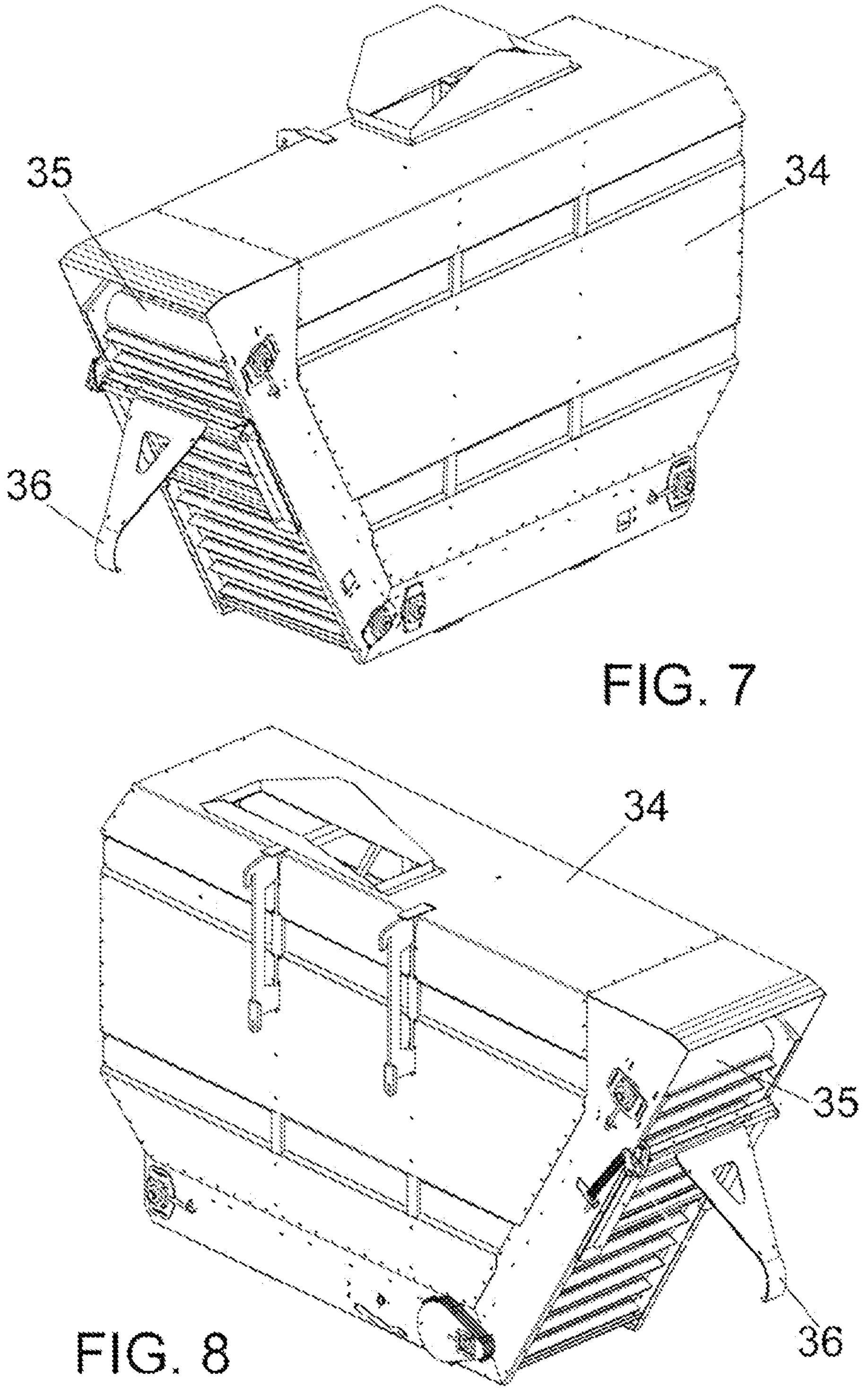
FIG. 7.—Shows a perspective view of one of the hoppers with continuous unloading system participating in the device of the invention.
FIG. 8.—It shows, finally, an opposite perspective view of the device of FIG. 7.

FIGS. 5 and 6 show the machine in folding position, in which the upper segments (23) of the gantries (20, 21) have been successively folded with respect to the vertical uprights (22).

The folded condition shown in the figure allows to appreciate how the side frames (16, 17) are now in respectively adjoined positions, thereby reducing the width of the machine to minimum values.

As previously mentioned, each side frame includes a hopper (33) sized much larger than the hoppers of conventional machines, thus allowing a much higher storage capacity.

The conveyor belts (27) of each of the side channels, drag the fruits towards the rear end of the machine, wherein lateral conveyor belts (25) are established, which feed voluminous hoppers (34) in which the fruits are stored, prior to passing through peelers, so that the fruit can be discharged through expulsion conveyor belts (35) which are only activated in the presence of a transfer vehicle, either by means of a mechanical push button (36), optical or magnetic sensors, or any other sensor without magnetic contact.

Prior to the lateral conveyor belts (25), and in correspondence with the rear end of the conveyor belts (27), there are de-stemmers (39) in the form of a Ferris wheel, which, by means of rotating radial arms, expel the branches that have fallen on the conveyor belt, avoiding access to the hoppers (34), embodiment that is complemented with steel bars, crossed over the belts, arranged laterally to the de-stemmers (39) in the form of a Ferris wheel, defining a kind of shield that prevents the branches from accessing the conveyor belts.

Likewise, in this area there are fans (40) that expel the fallen leaves, also preventing them from reaching the aforementioned hoppers (34).

This makes it possible to offer a continuous and moving unloading system, synchronizing the movement of the transfer vehicle with the harvesting machine.

As for the radiator of the vehicle's engine, it has been foreseen that it incorporates a fan with a rotation reversal system that prevents the leaves from sticking to such radiator.

Figure 3:
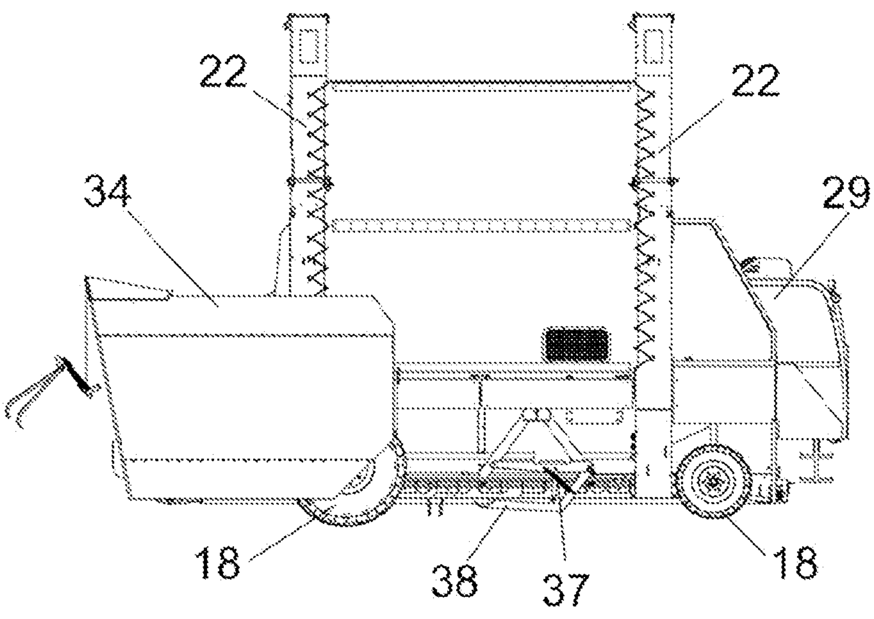
FIG. 3.—Shows a profile view of the assembly of FIGS. 1 and 2.
Figure 4:
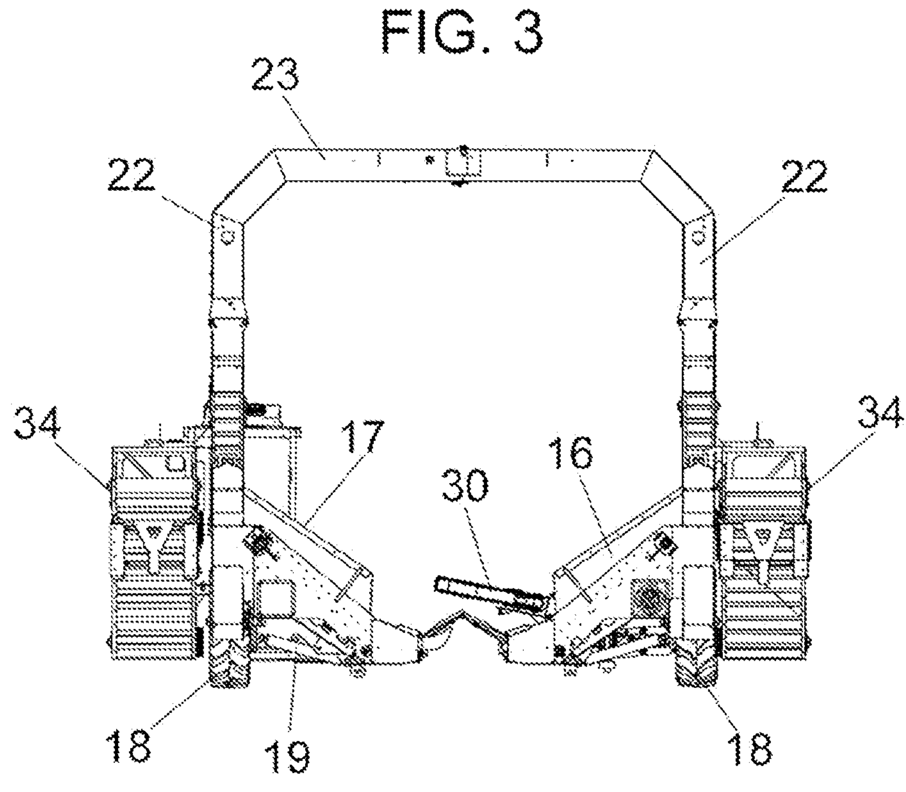
FIG. 4.—Shows a rear elevation view of the machine of FIGS. 1 to 3.

As can be seen in FIGS. 3 and 6, in correspondence with the frame that includes the vibrator, the machine incorporates a sliding skid (38), extendable by means of a hydraulic system, which supports and slides on the ground, which allows the machine to continue moving, but largely prevents the vibrations generated by the vibrator from being absorbed by the suspension system and the wheels, as they are transmitted directly to the ground.

More specifically, this skid remains elevated during movement/displacement and a few seconds before starting to vibrate it lowers to the ground by exerting a hydraulic force against it, through a hydraulic cylinder (37), which gives greater structural rigidity to the assembly and prevents the tree roots from moving, so that it only flexes the trunk.

The invention claimed is:

1. A self-propelled fruit harvesting machine for harvesting fruit from a tree by means of the action of a vibrator on the trunk of the tree when the presence of the tree trunk is detected by means of probes, the machine comprising:

a first lateral frame and a second lateral frame between which there is a lower longitudinal opening for the passage of the tree as the machine moves, the first lateral frame and the second lateral frame are linked at the top by two parallel gantries, extended transversely and separated by a certain distance in a longitudinal direction, the machine having dragging means, located inside respective longitudinal channels, to move detached fruits towards the rear part of each of the first lateral frame and the second lateral frame are, wherein each of the first lateral frame and the second lateral frame have a folding character, characterized in that the dragging means of the side frames unload over lateral conveyor belts, which feed voluminous hoppers equipped with peelers at their entrance, in which the fruits are stored, so that they can be unloaded with the machine in motion through expulsion conveyor belts which include means of activation/unloading in the presence of a transfer vehicle, by means of a mechanical push button, optical, magnetic sensors or any other sensor without magnetic contact;

further comprising de-stemmers, between the dragging means of the lateral frames and the lateral conveyor belts, wherein said de-stemmers are in the form of a Ferris wheel, in which a series of rotating radial arms participate, determining means of expulsion of the fallen branches on said dragging means and ventilators for the elimination of the fallen leaves.

2. The fruit harvesting machine, according to claim 1, wherein the first lateral frame comprises the vibrator, the machine incorporates a sliding skid, extensible by means of a hydraulic system, susceptible of supporting in a sliding way on the ground in the movement/displacement of the machine, determining a means of transmission of the vibrations generated to the ground.

3. The fruit harvesting machine, according to claim 1, wherein the cabin is movable between two limit positions and can be stabilized between any of the intermediate positions, being driven by an electric cylinder that can be controlled from inside the cabin by means of a lever.

4. The fruit harvesting machine, according to claim 1, in that wherein the cabin includes a control panel with means of control and programming of all the vibration and movement variables of the machine.

5. The fruit harvesting machine, according to claim 1, further comprising hopper load sensors.

6. The fruit harvesting machine, according to claim 1, further comprising detectors of obstruction of the peelers.

7. The fruit harvesting machine, according to claim 1, further comprising four-wheel drive.

8. The fruit harvesting machine, according to claim 1, further comprising a fan for the radiator of the machine's engine, fan that has a rotation reversal system for the same.

9. The fruit harvesting machine, according to claim 1, further comprising crossed steel bars between the lateral conveyor belts and laterally to the de-stemmers in the form of a Ferris wheel, that define an access shield for the branches towards said lateral conveyor belts.

10. A self-propelled fruit harvesting machine for harvesting fruit from a tree by means of the action of a vibrator on the trunk of the tree when the presence of the tree trunk is detected by means of probes, the machine comprising:

a first lateral frame and a second lateral frame between which there is a lower longitudinal opening for the passage of the tree as the machine moves, a first lateral frame and a second lateral frame are linked at the top by two parallel gantries, extended transversely and separated by a certain distance in a longitudinal direction, the machine having dragging means, located inside respective longitudinal channels, to move the detached fruits towards the rear part of each of the side frame, wherein each of said frames has a folding character, characterized in that the dragging means of the side frames unload over lateral conveyor belts, which feed voluminous hoppers equipped with peelers at their entrance, in which the fruits are stored, so that they can be unloaded with the machine in motion through expulsion conveyor belts which include means of activation/unloading in the presence of a transfer vehicle, by means of a mechanical push button, optical, magnetic sensors or any other sensor without magnetic contact;

wherein that the cabin is movable between two limit positions and can be stabilized between any of the intermediate positions, being driven by an electric cylinder that can be controlled from inside the cabin by means of a lever.

11. The fruit harvesting machine, according to claim 10, wherein the first lateral frame comprises the vibrator, the machine incorporates a sliding skid, extensible by means of a hydraulic system, susceptible of supporting in a sliding way on the ground in the movement/displacement of the machine, determining a means of transmission of the vibrations generated to the ground.

12. The fruit harvesting machine, according to claim 10, wherein the cabin is movable between two limit positions and can be stabilized between any of the intermediate positions, being driven by an electric cylinder that can be controlled from inside the cabin by means of a lever.

13. The fruit harvesting machine, according to claim 10, wherein the cabin includes a control panel with means of control and programming of all the vibration and movement variables of the machine.

14. The fruit harvesting machine, according to claim 10, further comprising hopper load sensors.

15. The fruit harvesting machine, according to claim 10, further comprising detectors of obstruction of the peelers.

16. A self-propelled fruit harvesting machine for harvesting fruit from a tree by means of the action of a vibrator on the trunk of the tree when the presence of the tree trunk is detected by means of probes, the machine comprising:

a first lateral frame and a second lateral frame between which there is a lower longitudinal opening for the passage of the tree as the machine moves, a first lateral frame and a second lateral frame are linked at the top by two parallel gantries, extended transversely and separated by a certain distance in a longitudinal direction, the machine having dragging means, located inside respective longitudinal channels, to move the detached fruits towards the rear part of each of the side frame, wherein each of said frames has a folding character, characterized in that the dragging means of the side frames unload over lateral conveyor belts, which feed voluminous hoppers equipped with peelers at their entrance, in which the fruits are stored, so that they can be unloaded with the machine in motion through expulsion conveyor belts which include means of activation/unloading in the presence of a transfer vehicle, by means of a mechanical push button, optical, magnetic sensors or any other sensor without magnetic contact;

wherein that the cabin is movable between two limit positions and can be stabilized between any of the intermediate positions, being driven by an electric cylinder that can be controlled from inside the cabin by means of a lever; further comprising detectors of obstruction of the peelers.

17. The fruit harvesting machine, according to claim 16, wherein the first lateral frame comprises the vibrator, the machine incorporates a sliding skid, extensible by means of a hydraulic system, susceptible of supporting in a sliding way on the ground in the movement/displacement of the machine, determining a means of transmission of the vibrations generated to the ground.

18. The fruit harvesting machine, according to claim 16, wherein the cabin is movable between two limit positions and can be stabilized between any of the intermediate positions, being driven by an electric cylinder that can be controlled from inside the cabin by means of a lever.

19. The fruit harvesting machine, according to claim 16, wherein the cabin includes a control panel with means of control and programming of all the vibration and movement variables of the machine.

20. The fruit harvesting machine, according to claim 16, further comprising hopper load sensors.

* * * * *